June 7, 1955
M. A. NAPIER
2,709,956
SCREW CONVEYOR PRESS
Filed Oct. 18, 1949
2 Sheets-Sheet 2
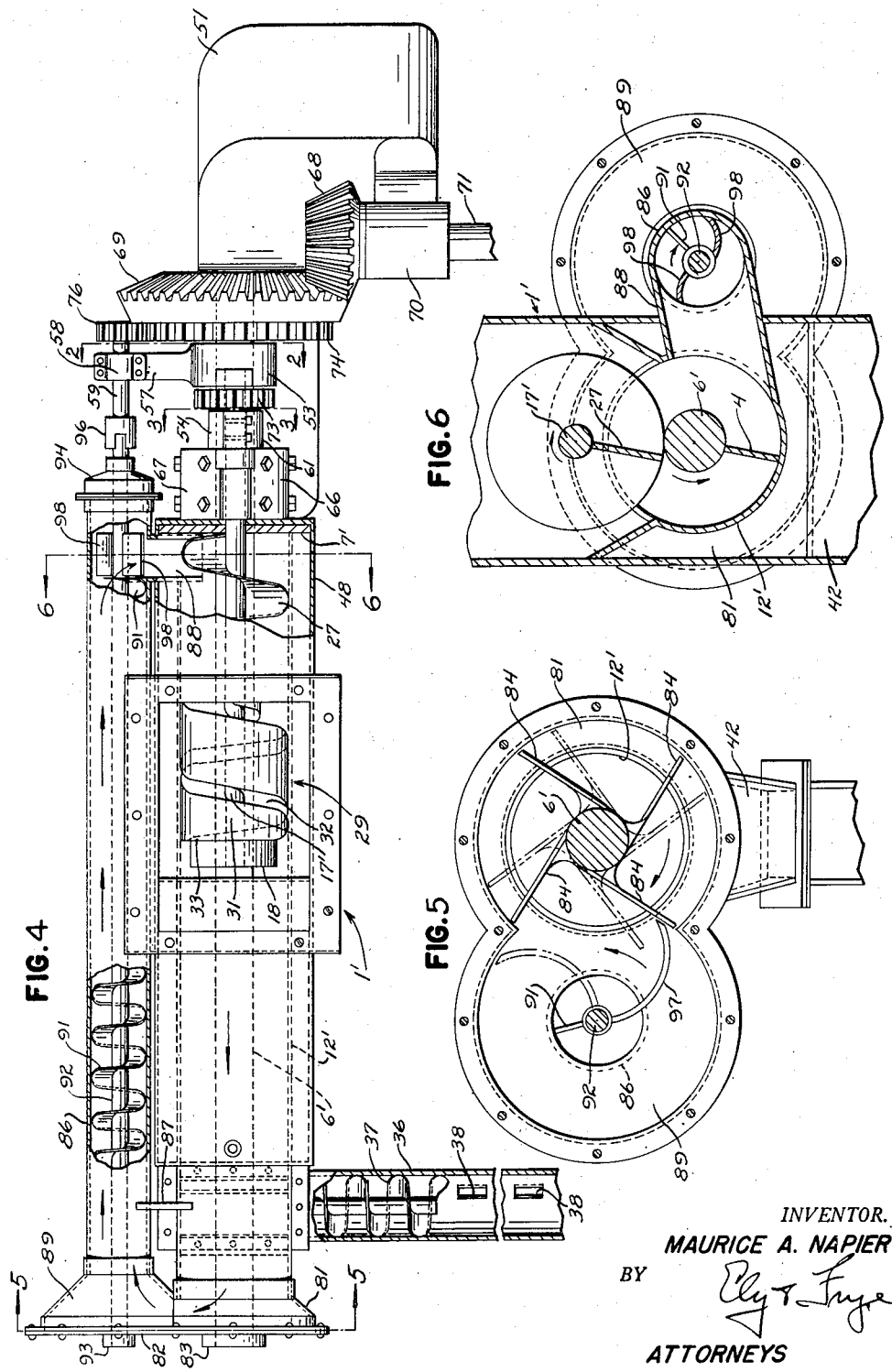
INVENTOR.
MAURICE A. NAPIER
BY
ATTORNEYS United States Patent Office 2,709,956
Patented June 7, 1955

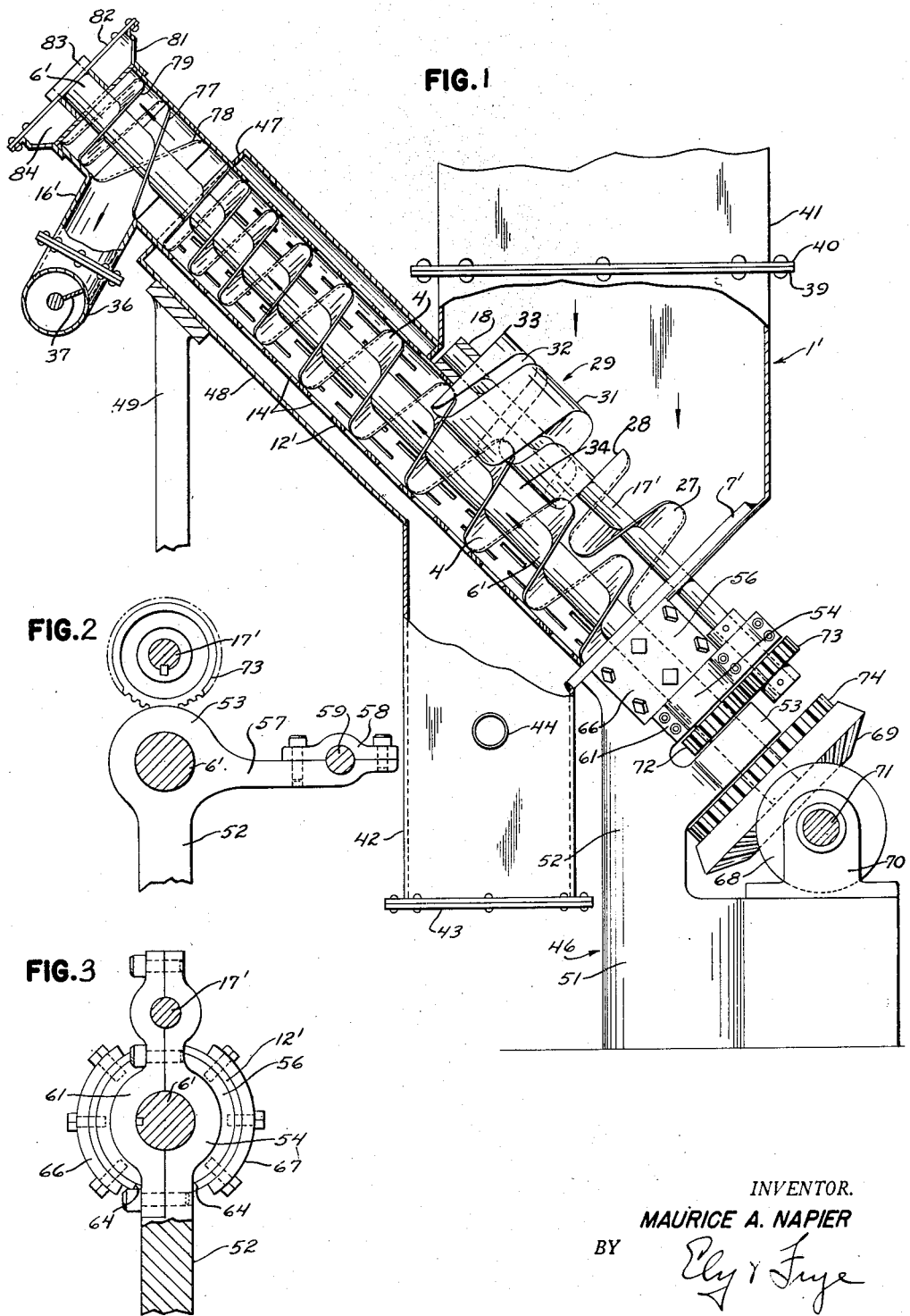

2,709,956

SCREW CONVEYOR PRESS

Maurice A. Napier, Akron, Ohio

Application October 18, 1949, Serial No. 122,043

3 Claims. (Cl. 100—72)

This invention relates to a screw conveyor press. In screw conveyors, generally speaking, the object is to move material axially of the screw, and means are provided to effect this result rather than to have the material merely rotate with the screw. In the handling of loose, granular material, for instance, it is customary to increase the pitch of the screw or increase the cross-sectional area of the screw housing in the regions beyond the charging opening. In either case, the housing is only partly filled and the material, in tending to rotate with the screw, is slanted and tends to roll back under the influence of gravity. In doing so it follows the course of the screw and therefore advances.

In screw conveyor presses, on the other hand, where it is desired to extract liquid from a continuously moving mass, the system is reversed, either the pitch of the screw or housing size, or both, being reduced in regions beyond the charging opening. In devices of this nature, it is essential that charging be positive and continuous in order that the material will be forced along the screw housing and not merely rotate. By the present invention I have not only contrived an effective means of continuous charging but also, by the same means, a pre-compacting of the material. Briefly stated, this is accomplished by a roller of helical-spiral form rotating on an axis parallel to that of the main screw and interengaged therewith whereby the fed material is first received between the flanges of the main screw and the small-radius end of the roller, and is forced along the main screw by the opposite rotation of the roller, and is gradually compressed as it approaches the large-radius end of the roller, and then passes on into the advanced regions of the screw which may be reduced in pitch to provide further compacting. The compactor thus provides a continuous, positive feed. In another feature of the invention, an auxiliary screw is provided co-axially of the compactor and mating with the main screw under the hopper to increase the feed to the compactor.

In the press of this invention, the pressures attain high values, and a slight obstruction to the free exit of pressed material may result in breakage within the system. In another feature of the invention, relief is provided for such conditions by means of a recirculation of material through the press.

It is, therefore, an object of the invention to provide a positive feed for a screw conveyor press. Another object is to provide positive feed in a screw conveyor press which, additionally, affords a compacting function. Yet another object is to provide, in a screw conveyor press, positive feed and pre-compacting together with novel charging means in association therewith.

A still further object of the invention is to provide relief means to allow continued operation of the press during periods of obstruction to free outflow of material.

These and other ends, which will be apparent to those skilled in the art, are attained by the present invention, a preferred form of which is described in the accompanying specification and illustrated in the drawings, in which:

Fig. 1 is a sectional view of a screw conveyor press, taken axially of the main screw, Fig. 2 is a section taken on the line 2—2 of Fig. 4, Fig. 3 is a section taken on the line 3—3 of Fig. 4, Fig. 4 is a view of Fig. 1 from above, taken perpendicularly to the main conveyor screw, Fig. 5 is a view taken on the line 5—5 of Fig. 4, and Fig. 6 is a view taken on the line 6—6 of Fig. 4.

Referring to the drawings by characters of reference, there is shown, generally, at 1', a hopper supported as will be later described. An inclined, helical conveyor screw 4 is integral with a shaft 6', which latter at its lower end extends through a thick plate 7' welded to the hopper 1' and, both ends of which are journaled as will be later referred to. It will be noted that the pitch of screw 4 gradually diminishes in the direction of its upward extent.

Closely surrounding screw 4 is a tube 12' received at its lower end in an opening in a wall of hopper 1' adjacent plate 7'. At its ends the tube is supported in a manner to be described. The tube 12' has through openings 14 of rectangular form throughout and is spaced, on its lateral sides and underside, from the walls of hopper 1' so that liquid may pass through to the hopper and ultimately pass out through the lower portion thereof. On the underside and near the top of tube 12' is a discharge tube 16', located beyond the terminus of screw 4.

A second shaft 17', above and parallel to shaft 6', is also journaled beyond plate 7' as will be referred to, and in a bushing 18 secured to the top of tube 12' midway of the length thereof. Shaft 6' is rotated through appropriate gearing in a manner to be described. Shafts 6' and 17' carry meshing gears which will be later referred to, outwardly of plate 7', whereby shaft 17' is constrained to rotate in a direction opposite to that of shaft 6'. A short screw 27, carried on the lower end of shaft 17' and extending from plate 7' to a location on the shaft indicated by the numeral 28 at the terminal edge of the screw, is similar in size and pitch to the lower end of screw 4 and is set at one-half pitch out of phase with screw 4, whereby to clear the same upon opposite rotation of the screws.

Also carried on shaft 17', for rotation therewith, is a helical drum 29 having a broad, outer face 31 and the convolutions being spaced by a helical groove 32. The latter is adapted to mesh with the blades of screw 4 and the peripheral face 31, therefore, moves between the blades of screw 4. At its outer end 33, the drum 29 has a radius reaching closely adjacent the shaft 6' and the radius diminishes, spiral fashion, along the downward extent of shaft 17' until it coincides with the radius of shaft 17' at the location of upper edge 28 of screw 27.

The purpose of helical drum 29 is twofold; both to compress material being conveyed along tube 12' and to check tendency of the moving material to back-flow. Screw 27 acts as a feeder for the spiral drum compressor. In an ordinary, single screw conveyor, the screw tube cannot, generally speaking, be filled if the conveyor is to function properly. This is especially true when the conveyor is inclined to the horizontal. A single screw, therefore, would not be adequate to provide material to occupy space 34 between shaft 6' and drum 29 for the compacting operation. Auxiliary screw 27, however, serves to keep an abundant supply of material at all times between itself and screw 4 and continuously delivers the same into the space 34. Thus, screw 27 acts as an auxiliary feeder and a check device, and drum 29 acts as a compactor, feeder, and check device.

After the compacted material passes beyond drum 29, it only partially occupies the available space in tube 12′. Since it is desirable to prolong the compression action over a period of time sufficient to eliminate substantially all of the liquid, the gradually diminishing pitch is provided in screw 4 so that the material will crowd up and fill the tube. This results in a pressure which serves to evacuate further liquid, which drains out through openings 14. The resulting pressure in the system has been found to be so great that by merely covering the outlet with the hand, sufficient back pressure arises to cause breakage in the machinery.

In operation of the elements described so far, a highly liquid mix, such as brewery waste, is led into the hopper and a large portion of the water immediately leaves through the lower portion of the hopper. Screws 4 and 27, coacting, carry a substantial stream of wet grain, which is delivered into space 34 and is carried along the conveyor while being thoroughly compacted in a gradual manner by the helical-spiral drum 29, to eliminate further water. Thereafter, the compacted mass moves into the upper part of tube 12′, where it is further compacted by the diminishing pitch of the screw to eliminate still more water. The grain finally passes out through discharge tube 16′, from where it may be conducted for further treatment, such as drying in a suitable oven.

If delivery for subsequent treatment is effected at a metered rate, the effects of back pressure will require consideration for the case where, for any reason, delivery falls below the output of the screw conveyor press. This situation is dealt with as follows.

As shown, outlet 16′ leads to a lateral conduit 36, housing a conveyor screw 37. The latter may have a plurality of outlets such as 38 leading to a plurality of drying ovens (not shown), any or all of which may be served at one time. With all outlets 38 open, the full capacity of screw 37 is utilized, and this will be slightly in excess of the capacity of the screw press. Therefore, if one or more of openings 38 are closed, the full discharge through outlet 16′ will not be accommodated and a corresponding back pressure will arise in the screw press. It is the relief of this condition that is obtained by a return circuit in the screw press, which is capable of recirculating the entire feed of the press.

The hopper 1′ has an upper flange 39 adapted for securement by riveting or bolting to a flange 40 on a conduit 41, which is in turn secured at an appropriate location inside a building. The hopper has a lower chamber or sump 42 with a removable bottom 43 and a disposal pipe 44 located somewhat above the bottom so that sediment in the drainings will collect in the bottom and may be removed at intervals.

A mount, indicated generally at 46, comprises the main support and journal means for the various screws of the press. The tube 12′, surrounding the main conveyor screw, is outwardly held in an end flange 47 of an oblique extension tube 48 of the hopper. Additional support for the outward end of the press unit may be had by means of an upright 49 attached at its upper end to the extension tube 48.

The mount comprises a main base 51, an upright 52, and axially oblique bearing portions 53, 54, 56, having suitable bearing sleeves (see Figs. 2 and 3). Bearing portion 53 has a laterally extending arm 57, with a split bearing 58 which mounts a stub shaft 59 adapted to actuate the return screw, presently to be described. Bearing portion 54, best seen in Fig. 3, provides support for shafts 6′ and 17′ and is of the split type having a bearing plate 61 bolted to the portion 54 integral with the mounting. Bearing portion 56 comprises a ring portion integral with the base mounting and around which the screw tube 12′ is received, being cut out at 64 to clear the base portion 52, the tube 12′ being secured in place by means of arcuate clamping plates 66, 67 bolted to the ring 56.

Shaft 6′ is driven by a set of bevel gears 68, 69, the former mounted on a shaft 71 journaled in a bracket 70 and adapted to be rotated by connection with a suitable source of power (not shown).

A gear 72, on shaft 6′ and located between bearing portions 53, 54, meshes with a similar gear 73 on shaft 17′ so as to drive the latter in an opposite direction from that of shaft 6′. A gear 74, on shaft 6′ between bevel gear 69 and bearing portion 53, meshes with a gear 76, on stub shaft 59, to which it bears a 4:1 ratio for a purpose presently to be explained.

*The relief mechanism and return feed*

Mounted on shaft 6′, forwardly of the end of screw 4 and adjacent the opening into outlet tube 16′, is a short section of a double-bladed screw with blades indicated by 77, 78. As shown, this screw section is about one-half pitch in length. Forwardly of blades 77, 78 is a short section 79 of a single bladed screw having a pitch about the same as that of the outer end of screw 4. A flared section 81 is received on the outer end of tube 12′ and is enclosed with a suitable cover plate 82 having a central boss 83 providing terminal bearing support for shaft 6′. Secured to shaft 6′ and contained within end section 81 are four paddles 84.

A return tube 86 is arranged alongside tube 12′, in parallel relation thereto, and is secured to the extension 48 of the hopper by a connecting web 87, forwardly located, and by a rearwardly located conduit 88 which communicates between tube 86 and tube 12′. In addition, tube 86 is secured to tube 12′ by means of a forward flared mouth 89 in intersecting relation with flared mouth 81 of tube 12′ and secured, as by welding, along the line of intersection. The cover plate 82 serves to close both flared mouths, as will be seen from Fig. 4.

A return screw 91 is housed in tube 86 and is carried on a shaft 92, forwardly journaled in a boss 93 on closure plate 82 and rearwardly journaled in an end cap 94 secured to tube 86. Shaft 92 and stub shaft 59 are connected through a coupling 96.

Shaft 92 carries, near its forward end, a curved blade or paddle 97 formed to sweep the interior of flared mouth 89 and adapted to interengage with paddles 84 rotating in flared mouth 81 of tube 12′. Due to the 4 to 1 ratio in gears 74, 76, the paddle 97 will revolve at a rate sufficient to scoop material from between pairs of blades 84, in succession, as they appear at the opening between flared mouths 81, 89. The commencement of such a scooping action is shown by the paddles in solid lines in Fig. 5 and the situation of the paddles after 90° of rotation of shaft 92 is indicated in broken lines. At the start of the action, a pair of blades 84 spans the opening between the paddle housings and paddle 97 is just commencing its sweep through the opening. The sweep of paddle 97 is relatively rapid and, in moving through 90° to the dotted line position shown, it will have traversed the entire opening while the lower blade 84 will have moved only through 22.5° to the dotted line position shown. During the interval that paddle 97 is completing a revolution of 360°, a succeeding paddle 84 will have moved into position at the opening and the cycle is repeated. This provides for a thorough removing action for material delivered into housing 81 and a rapid recirculation of the same by the fast-moving screw 91. The return cycle is completed with the forcing of material back into hopper 1′ by a double-bladed paddle 98 carried by shaft 92 and located adjacent return duct 88.

*Operation*

Material fed into hopper 1′ is conveyed along tube 12′ by screw 4, the volume advanced being approximately doubled by action of upper screw 27. The thus loaded screw system feeds the compacting spiral screw 29 so that initial elimination of liquids is effected and the thus compacted material is advanced, without chance of backing up, to the region of reduced pitch of main screw 12′, where it is further compressed to eliminate water.

Upon reaching the double screw 77, 78 of increased pitch, the material is loosened from its compacted condition for ready flow through lead-out pipe 16' and conveyance by conventional screw 37 to the various outlets.

As long as disposal of the de-watered material is operating at full capacity, the screw press may also operate at full capacity. However, if for some reason disposal is curtailed, the relief features will operate to avoid damage to the screw press. Assuming, therefore, that elimination from the tube 36 is, for some reason, curtailed, the material will back up into screw 77, 78 and will be picked up by screw 79 and conveyed to housing 81. From there, it is removed by paddle 97, as previously explained, and returned by screw 91 and paddle 98 to the hopper. Upon restoration of full capacity disposal, the loosened material will again fall through outlet 16' in preference to the pick-up of screw 79 and the recirculation will cease.

Thus the safety feature is automatic in operation and provides for operation of the screw press at full capacity and without attention, regardless of varying conditions of output volume.

While a preferred embodiment has been shown, the invention is not limited thereby since changes in the exact size, shape and arrangement, for instance, of the various parts may be resorted to without departing from the spirit or scope of the appended claims.

What is claimed is:

1. In combination, a housing, a main conveyor screw in said housing, a compacting screw of helico-spiral form intermeshing with said main screw, and of a width to substantially occupy the inter-blade distance of the main screw, means to augment the pick-up of the main screw whereby to feed material into said compacting screw, said housing having an outlet for material delivered therethrough, means providing for further compacting of said material beyond said compacting screw, means providing for relief of said compacting in the vicinity of said outlet, a return conveyor for recirculation of material through said housing in response to pressure conditions in said outlet, and means to transfer material from said housing to said return conveyor.

2. In combination, a main housing having inlet means, a main conveyor screw in said main housing, said housing having an outlet for material delivered along said housing by said screw, an auxiliary housing communicating at one of its ends with said main housing adjacent said outlet and at its other end with said inlet means, and a conveyor screw in said auxiliary housing for recirculation of material, said main conveyor screw having a portion of increased pitch adjacent said outlet whereby pressure on said material is relieved so that it may freely pass through said outlet, and said auxiliary housing adapted to recirculate said material in response to back pressure on said material through said outlet.

3. In combination, a housing, a conveyor screw in said housing, said housing having an outlet for material delivered therethrough, said screw having a portion of increased pitch in the vicinity of said outlet, a conduit including a conveyor for recirculation of material through said housing in response to pressure conditions in said outlet, and means to transfer material from said housing to said conduit, said means comprising a first rotatable, bladed member associated with said housing, and a second rotatable, bladed member associated with said conduit, having a lesser number of blades than said first bladed member and rotatable at a greater angular velocity than said first bladed member.

References Cited in the file of this patent

UNITED STATES PATENTS

| | | |
|---|---|---|
| 714,174 | Guy | Nov. 25, 1902 |
| 1,069,546 | Guy et al. | Aug. 5, 1913 |
| 1,213,171 | Erfurth | Jan. 23, 1917 |
| 1,219,279 | Fiddyment | Mar. 13, 1917 |
| 1,333,249 | Fiddyment | Mar. 9, 1920 |
| 1,847,690 | Hottmann | Mar. 1, 1932 |
| 2,148,205 | Kiesskalt | Feb. 21, 1939 |
| 2,360,984 | Schmitz | Oct. 24, 1944 |
| 2,441,222 | Fuller | May 11, 1948 |

FOREIGN PATENTS

| | | |
|---|---|---|
| 18,365 | Netherlands | July 16, 1928 |